UNITED STATES PATENT OFFICE 1,980,515

ACID WOOL AZO DYESTUFFS

Erich Fischer, Bad Soden-on-the-Taunus, Germany, assignor to General Aniline Works, Inc., New York, N. Y., a corporation of Delaware No Drawing. Application April 20, 1933, Serial No. 667,113. In Germany May 2, 1932

5 Claims. (Cl. 260—92)

The present invention relates to new valuable acid wool dyestuffs, more particularly it relates to acid azo dyestuffs obtainable by coupling in an acid solution a diazo compound of ortho-amino-diphenylsulfone or a substitution product thereof containing in one or both of the phenyl radicals a substituent or substituents of the group consisting of halogen, alkyl and alkoxy with 2-amino-8-hydroxy-naphthalene-6-sulfonic acid.

The dyestuffs, thus obtained, may be characterized by the general formula:

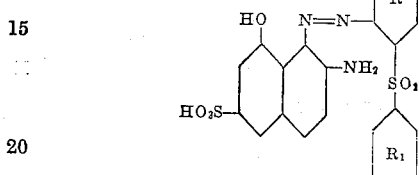

wherein the nuclei R and R₁ are unsubstituted or at least one of them contains a substituent of the group consisting of halogen, alkyl and alkoxy.

These new dyestuffs have a good levelling power and dye wool from an acid bath red shades of good fastness to light.

The following examples serve to illustrate the invention but they are not intended to limit it thereto, the parts being by weight, unless otherwise stated:

(1) 233 parts of ortho-amino-diphenylsulfone are finely dispersed in 700 parts of water and about 500 parts of concentrated sulfuric acid and diazotized with a concentrated aqueous solution of 69 parts of sodium nitrite. In the diazo-solution, thus obtained, the excess of mineral acid is neutralized in the usual manner and the solution is run into an acid suspension of 2-amino-8-hydroxynaphthalene-6-sulfonic acid. There is obtained a bluish-red dyestuff which, when isolated and dried, forms a violet powder; it dyes wool from an acid bath very even, bluish-red shades of good fastness to light. The dyestuff corresponds to the formula:

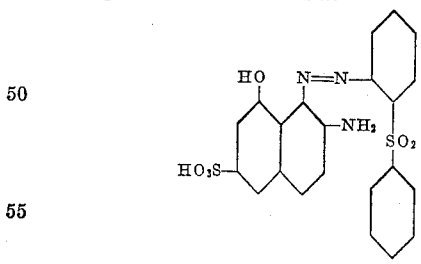

(2) 247 parts of ortho-aminophenyl-para-tolylsulfone are dissolved, while hot, in 700 parts of water and 300 parts by volume of concentrated sulfuric acid. Under the surface of the cooled suspension of the sulfate an aqueous solution of 69 parts of sodium nitrite is run in at about 15° C. to about 20° C., while slightly cooling. During the diazotization the whole at first dissolves and then the diazonium sulfate separates for the greatest part.

250 parts of 2-amino-8-hydroxynaphthalene-6-sulfonic acid are dissolved with addition of sodium carbonate in as small a quantity of water as possible. The whole is cooled to 0° C. and rendered weakly acid to Congo-paper while vigorously stirring. To the suspension, thus obtained, the strongly acid suspension of the diazonium sulfate is added, suitably in several portions. According to the degree of dilution and the temperature applied, the coupling is finished within 2 to 4 hours. Or, the acid may partly be neutralized during the coupling, for instance, by means of sodium acetate, but this is not necessary in view of the high coupling power of the diazo-compound. The dyestuff is isolated and dried in the usual manner; it has the same properties as that described in Example 1 and it may be represented by the formula:

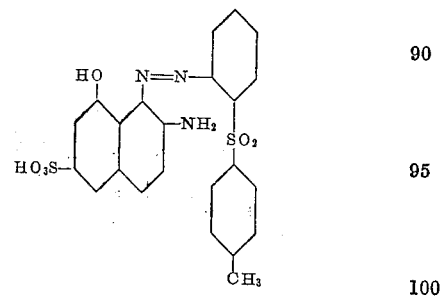

Dyestuffs of similar properties are obtained by using the diazo compounds of 2-amino-4'-ethoxy-diphenylsulfone, 2-amino-4'-methoxy-diphenylsulfone, 2-amino-4'-ethyl-diphenylsulfone and others.

(3) 267.5 parts of 2-amino-4'-chloro-diphenylsulfone are diazotized according to the statements in Example 1 and combined with an acid suspension of 250 parts of 2-amino-8-hydroxy-naphthalene-6-sulfonic acid as described in Example 2. The dyestuff is isolated and dried in the usual manner; it has the same properties as that of Example 1 and corresponds to the following formula:

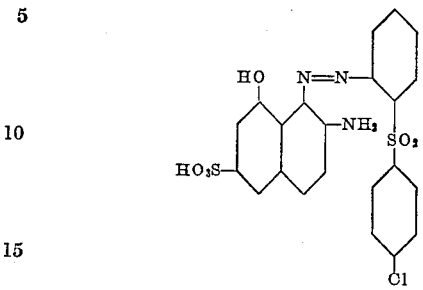

The corresponding bromo compound yields a dyestuff of similar properties.

(4) By replacing in Example 3, 2-amino-4'-chloro-diphenylsulfone by 267.5 parts of 2-amino-5-chloro-diphenylsulfone, a dyestuff of similar properties is obtained. It has the following formula:

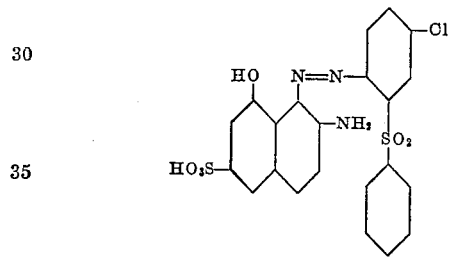

Instead of the ortho-amino-diphenylsulfone compounds used as components in the above examples there may be used other compounds of the above general formula, for instance, the compounds 2-amino-2'-methyl-diphenylsulfone or 2-amino-4-chloro-4'-methyl-diphenylsulfone.

I claim:
1. The azo dyestuffs of the general formula:

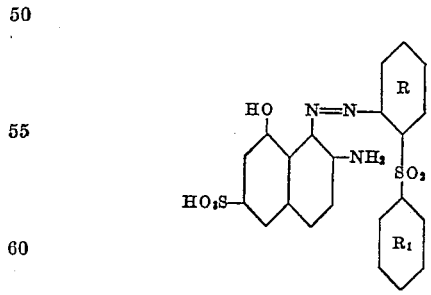

wherein the nuclei R and $R_1$ are unsubstituted or at least one of them contains a substituent of the group consisting of halogen, alkyl and alkoxy, forming, when dry, red or violet powders, being soluble in hot water and yielding on wool red shades of good levelling power and of good fastness to light.

2. The azo dyestuffs of the general formula:

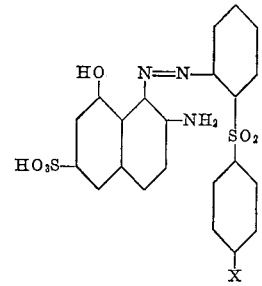

wherein X represents hydrogen or a substituent of the group consisting of halogen, alkyl and alkoxy, forming, when dry, red or violet powders, being soluble in hot water and yielding on wool red shades of good levelling power and of good fastness to light.

3. The azo dyestuff of the formula:

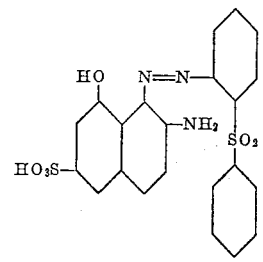

forming, when dry, a violet powder and dyeing wool from an acid bath very even bluish-red shades of very good fastness to light.

4. The azo dyestuff of the formula:

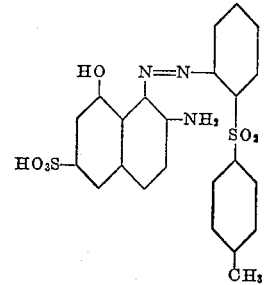

forming, when dry, a violet powder and dyeing wool from an acid bath very even bluish-red shades of very good fastness to light.

5. The azo dyestuff of the formula:

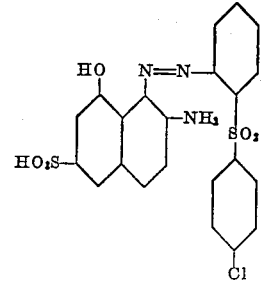

forming, when dry, a violet powder and dyeing wool from an acid bath very even bluish-red shades of very good fastness to light.

ERICH FISCHER.